United States Patent
Kruglick

(10) Patent No.: US 8,845,780 B2
(45) Date of Patent: Sep. 30, 2014

(54) ELECTRIC ARC FURNACE DUST RECYCLING APPARATUS AND METHOD

(75) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 106 days.

(21) Appl. No.: 13/386,095

(22) PCT Filed: Aug. 16, 2011

(86) PCT No.: PCT/US2011/047884
§ 371 (c)(1),
(2), (4) Date: Jan. 20, 2012

(87) PCT Pub. No.: WO2013/025200
PCT Pub. Date: Feb. 21, 2013

(65) Prior Publication Data
US 2013/0042722 A1    Feb. 21, 2013

(51) Int. Cl.
*C22B 19/34*    (2006.01)
*C22B 7/02*    (2006.01)

(52) U.S. Cl.
CPC ................................ *C22B 7/02* (2013.01)
USPC ................................ 75/660; 75/585; 75/433

(58) Field of Classification Search
CPC ........ C22B 7/02; C22B 1/005; C22B 13/045; Y10S 75/961
USPC .......................................................... 75/751
See application file for complete search history.

(56) References Cited

U.S. PATENT DOCUMENTS

| | | | |
|---|---|---|---|
| 4,384,886 A * | 5/1983 | Stift | ................................ 75/487 |
| 4,762,554 A | 8/1988 | Lazcano-Navarro | |
| 5,013,532 A | 5/1991 | Sresty | |
| 5,569,152 A * | 10/1996 | Smith | .......................... 588/256 |
| 5,667,553 A | 9/1997 | Keegel, Jr. | |
| 6,563,855 B1 * | 5/2003 | Nishi et al. | ....................... 373/76 |
| 7,227,882 B2 | 6/2007 | Schaefer | |
| 7,399,454 B2 | 7/2008 | Koningen et al. | |

FOREIGN PATENT DOCUMENTS

| | | | |
|---|---|---|---|
| FR | 2373612 | | 7/1978 |
| GB | 1543432 A * | | 4/1979 |
| JP | 2005127767 A * | | 5/2005 |
| JP | 2008-291342 | | 12/2008 |
| KR | 20040039079 | | 5/2004 |
| WO | WO-2007/068025 | | 6/2007 |

OTHER PUBLICATIONS

Machine translation of JP2005127767, May 2005.*

(Continued)

*Primary Examiner* — Roy King
*Assistant Examiner* — Xiaowei Su
(74) *Attorney, Agent, or Firm* — Foley & Lardner LLP

(57) ABSTRACT

The present technology provides an illustrative apparatus for recycle electric arc furnace (EAF) dust and method of use related to the same. The apparatus has a heat controlling region coupled to a separation volume and includes at least one magnet and a cooling region. The heating controlling region operates at a temperature sufficient to transform at least some of the EAF dust into a mixture of gaseous zinc and one or more additional metals. The magnet separates the iron-rich material from the mixture of gaseous zinc and one or more additional metals and the cooling region condenses the gaseous zinc.

13 Claims, 2 Drawing Sheets

(56) References Cited

OTHER PUBLICATIONS

Barrett, E.C. et al., "A hydrometallurgical process to treat carbon steel electric arc furnace dust," *Hydrometallurgy,* 1992, vol. 30, pp. 59-68.

International Search Report and Written Opinion for Intl. Pat. Appln. No. PCT/US2011/047884 mailed Oct. 6, 2011, 10 pp.

Pizo, "The Pizo Advantage," printed on Dec. 8, 2011, retrieved from http://pizotech.com/technology/index.html, 1 p.

Raghavan, V., "Fe-Zn (Iron-Zinc)," *Journal of Phase Equilibria,* 2003, vol. 24, No. 6, pp. 544-545.

The Waelz Kiln, ValoRes GMbH, May 18, 2009, printed on Dec. 8, 2011, retrieved from http://www.valo-res.com/pdf/WaelzKilnDescription-EN.pdf, 10 pp.

Xia, D.K. et al., "Microwave Caustic Leaching of Electric Arc Furnace Dust," *Minerals Engineering,* 2000, vol. 13, No. 1, pp. 79-94.

You, M.V. et al., "Magnetism in Iron at High Temperatures," *Physical Review Letters,* May 12, 1980, vol. 44, No. 19, pp. 1282-1284.

International Preliminary Report on Patentability in International Application No. PCT/US2011/047884 dtd Feb. 27, 2014 (7 pages).

\* cited by examiner

ELECTRIC ARC FURNACE DUST RECYCLING APPARATUS AND METHOD

CROSS-REFERENCE TO RELATED APPLICATIONS

The present application is a U.S. national stage application claiming the benefit of International Application No. PCT/US2011/047884, filed on Aug. 16, 2011, the entire contents of which is incorporated herein by reference in its entirety.

BACKGROUND

The following description is provided to assist the understanding of the reader. None of the information provided or references cited is admitted to be prior art.

The production of steel in an electric arc furnace (EAF) typically results in a byproduct of about 15-20 kilograms of toxic heavy-metal dust per ton of produced steel. EAF dust has been classified as a hazardous waste by the Environmental Protection Agency and is the largest volume hazardous waste produced in the United States. In 2007, approximately one million tons of EAF dust was produced in the United States by American steel electric arc furnaces.

Various EAF dust recycling methods have been developed, resulting in the development of a new industry directed to EAF dust recycling. More than 750,000 tons of EAF dust are currently recycled in the United States each year. Various recycling processes such as the Waelz Kiln process are used to recover zinc, stainless steel additives, and iron-rich slag waste from the EAF dust. However, traditional EAF dust recycling processes require large amounts of EAF dust, and thus it is generally not cost effective to implement such processes on-site with typically-sized arc furnaces. As such, steel production companies generally must ship their EAF dust off-site for recycling and/or disposal at additional cost.

SUMMARY

The present technology includes an illustrative method for recycling electric arc furnace (EAF) dust. The method includes controlling a temperature of EAF dust within a heat controlling region such that the temperature of the EAF dust is sufficient to transform at least a portion of the EAF dust into a mixture of gaseous zinc and one or more additional metals that include iron-rich material and stainless steel additives. The method further includes magnetically separating the iron-rich material from the mixture of gaseous zinc and one or more additional metals, directing the gaseous zinc to a cooling region, and condensing the gaseous zinc within the cooling region.

The present technology provides an illustrative EAF dust recycling apparatus. The apparatus includes a heat controlling region and a separation volume. The heat controlling region is configured to control a temperature of EAF dust to transform at least a portion of the EAF dust into a mixture of gaseous zinc and one or more additional metals that include iron-rich material and stainless steel additives. The separation volume is coupled to the heat controlling region and includes at least one magnet and a cooling region. The at least one magnet is configured to magnetically separate the iron-rich material from the mixture of gaseous zinc and one or more additional metals. The cooling region is configured to condense the gaseous zinc.

The present technology also provides an illustrative apparatus for recycling EAF dust. The apparatus includes means for controlling a temperature of EAF dust to produce a mixture of gaseous zinc and one or more additional metals, means for magnetically separating iron-rich material from the mixture of gaseous zinc and one or more additional metals, and means for condensing the gaseous zinc.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
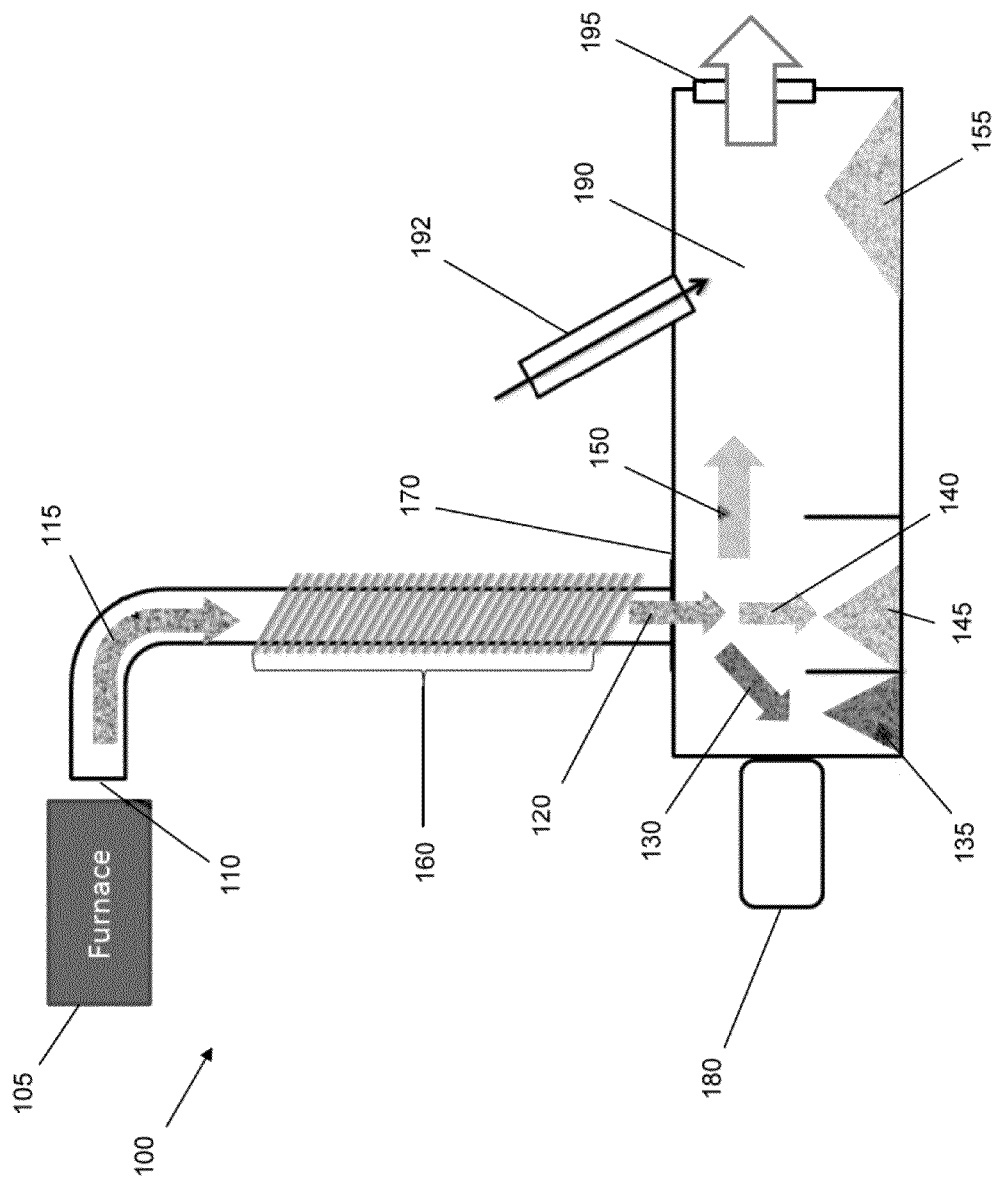
FIG. 1 depicts an electric arc furnace dust recycling apparatus in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various traditional recycling processes are used to recover zinc, stainless steel additives, and iron-rich slag waste from EAF dust. Such processes have included glassification processes, hydrometallurgic processes, pyronietallurgic processes, and dust processes. However, in order to make traditional EAF dust recycling processes economically feasible, such processes typically require EAF dust load sizes on the order of multiple tons. In addition, such processes typically require very large dedicated furnaces to process these large load sizes. Accordingly, it is generally not cost-effective to implement such processes along side typically-sized steel producing electric arc furnaces.

Described herein are illustrative methods and apparatuses for recycling EAF dust in smaller batch sizes that allow for on-site recycling of EAF dust along side steel production. Such methods and apparatuses allow for EAF dust batch sizes on the order of kilograms instead of tons and does not require the use of large furnaces to heat the EAF dust. In an embodiment, such an apparatus includes a heat controlling region configured to control the temperature of the EAF dust to transform the EAF dust into a mixture of various gaseous and solid components. A separation volume coupled to the heat controlling region is configured to receive and separate the various components of the EAF dust. The separation volume may include a magnet that attracts and separates iron-rich components of the EAF dust and a cooling region that cools and condenses gaseous components of the EAF dust.

FIG. 1 depicts an EAF dust recycling apparatus 100 in accordance with an illustrative embodiment. EAF dust recycling apparatus 100 includes an input portion 110 that is configured to receive EAF dust material 115 to be recycled. In an embodiment, EAF dust material 115 is provided in a reducing atmosphere such as hydrogen or carbon monoxide gas. In alternative embodiments, the reducing atmosphere may include dissociated ammonia or any other atmosphere configured to remove oxygen as known to those of skill in the art. In addition, an additional reductant such as carbon powder or any other suitable reductant known to those of skill in the art may be optionally added to the reducing atmosphere and EAF dust material 115 prior to their input into input portion 110.

In another embodiment, EAF dust material 115 may be pH balanced in accordance with a designated steel chemistry. Such pH balancing allows for corrosive trace elements such as metal salts (often associated with recycled steel used in modem "mini-mills") to be neutralized. Such a pH balancing operation may include a gaseous neutralization process or pH balancing of EAF dust material 115 within water as known to those of skill in the art. In an embodiment, the pH balancing may be accomplished by mixing EAF dust material 115 with a buffer solution such as a borate buffer solution, a phosphate buffer solution, or any other buffer solution as known to those of skill in the art.

In an embodiment, input portion 110 may be coupled to an output flow from a furnace 105 such that EAF dust material produced by furnace 105 is routed directly to input portion 110 of EAF dust recycling apparatus 100. According to such an embodiment, the EAF dust material produced by furnace 105 may include primarily heated arc furnace gases with few solid particles. In another embodiment, input portion 110 may not be coupled directly to an output flow of a furnace, but rather may be configured to receive cooled EAF dust material.

Input portion 110 is coupled to a heat controlling region 160 such that heat controlling region 160 may receive EAF dust material 115 from input portion 110. In an embodiment, heat controlling region 160 is coupled to input portion 110 by process tubing or piping. The process tubing or piping can generally have any diameter, varying according to the expected volume of EAF dust material to be handled. For example, the piping can have a diameter of about 1 centimeter (cm) to about 10 cm. In alternative embodiments, the piping may have a diameter outside of this size range according to the particular design needs of the system. The sizing of the tubing may be modified according to the needs of each specific EAF dust recycling apparatus 100 based on its anticipated EAF dust batch sizes. In an embodiment, the process tubing may include a refractory metal such as ceramic or brick to allow for high-temperature operation. The process tubing may include an insulative material such as Kaowool and may be surround with a safety shield or perimeter to prevent human contact or injury. In an embodiment, heat controlling region 160 is positioned near furnace 105 to avoid unnecessary heat loss. In an embodiment, the process tubing may have a length of about 75 meters. In alternative embodiments, the process tubing may have a length from about a meter to several hundreds of meters.

In alternative embodiments, heat controlling region 160 is configured to control the temperature of EAF dust material 115 such that at least a portion of EAF dust material 115 is transformed an appropriate mixture of gaseous and solid components. The specific size of heat controlling region 160 may also vary according to the needs of each specific EAF dust recycling apparatus 100 based on anticipated EAF dust batch sizes and mixes. Large batch sizes and high flow rates require a large sized heat controlling region 160, while smaller batch sizes and lower flow rates allow for a small sized heat controlling region 160. In an embodiment, heat controlling region 160 includes tubing have a diameter of about 10 cm and a length of about 75 cm. The diameter and length of the tubing may be varied depending on the flow rate so long as EAF dust material 115 is maintained at the desired temperature for a sufficient amount of time to precipitate the various solid particles as discussed further below. In an embodiment, the temperature of EAF dust material 115 is controlled such that a mixture of gaseous zinc, solid iron-rich particles, solid stainless steel component material particles, and possibly additional metal particles is formed. EAF dust material 115 may include any component material of the steel input into furnace 105. Accordingly, the composition of EAF dust material 115 will depend on the composition of the steel. In an embodiment, EAF dust material 115 may further include particles of silicon, sulfur, phosphorous, lead, manganese, and tin.

In an embodiment, heat controlling region 160 maintains the temperature of EAF dust material 115 with a range of between about 1665 degrees Fahrenheit (about 907 degrees Celsius) and about 2000 degrees Fahrenheit (about 1093 degrees Celsius). In an embodiment, EAF dust material 115 is maintained within heat controlling region 160 for about 30 seconds. In alternative embodiments, EAF dust material 115 may be maintained within heat controlling region 160 for any length of time needed to precipitate the solid particle discussed above. Such a temperature range allows for the iron-rich metals and other trace metals to substantially precipitate to or remain in solid form while allowing the zinc to change to or remain in a substantially gaseous form.

In an embodiment, heat controlling region 160 includes a heating structure that is configured to heat EAF dust material 115 as needed to produce and maintain a temperature of EAF dust material 115 within a desired temperature range. The EAF dust material 115 may include gases from furnace 105. In an embodiment, the heating structure comprises a carbon-augmented induction heating element as known to those of skill in the art. In additional embodiments, the heating element may be augmented with microwaves. In alternative embodiments, any heating structure known to those of skill in the art may be used.

In another embodiment, heat controlling region 160 may include a cooling structure that is configured to cool EAF dust material 115 to a temperature within the desired temperature range. According to such an embodiment, heat controlling region 160 may be insulated such that it may control the cooling of EAF dust material 115 as it passes through heat controlling region 160. The insulation may include Kaowool, fiberglass, mylar, air gaps, or any other insulation known to those of skill in the art. In an embodiment, passive cooling (La, no energy or cooled air is added to the system) may be used to cool EAF dust material 115. In another embodiment, outside cooling air may be injected into heat controlling region 160 or passed in proximity to heating controlling region 160 to cool EAF dust material 115.

In an embodiment, a feedback system may be used to control the heating and/or cooling within heat controlling region 160. Such a feedback system may include various temperature sensors positioned throughout heat controlling region 160 and communicatively coupled to a feedback circuit. The feedback circuit controls the heating and/or cooling structures of heat controlling region 160 according to the temperatures detected by temperature sensors as compared to a desired temperature. In alternative embodiments, any control system known to those of skill in the art may be used to control the temperature and heating/cooling of heat controlling region 160.

In an embodiment heat controlling region 160 comprises a vertical structure that is located between input portion 110 and a separation volume 170. According to such an embodiment, heat controlling region 160 may be configured to control the temperature of EAF dust material 115 as it falls within the vertical structure of heat controlling region 160 toward separation volume 170.

As mentioned above, EAF dust recycling apparatus 100 also includes separation volume 170 that is coupled to heating controlling region 160. Transformed EAF dust material 120 from heating controlling region 160 enters into separation volume 170. In an embodiment, separation volume 170 includes one or more magnets 180. Magnets 180 are configured to separate iron-rich material 130 from transformed EAF dust material 120 by virtue of the attraction of iron-rich material 130 to magnets 180. As transformed EAF dust material 120 passes into separation volume 170, iron-rich material 130 is pulled from transformed EAF dust material 120 toward magnets 180 and the separated iron-rich material 130 is collected in a collection area 135. Magnets 180 should have a strength large enough to overcome the airflow through separation volume 170 so as to pull iron-rich material 130 from the airflow. In an embodiment, magnets 180 may include electromagnets as known to those of skill in the art. Electromagnets may thus be turned on and off by applying or disconnecting power in order to facilitate collection of iron-rich material 180. In another embodiment, magnets 180 may include non-electrical magnets that may be temporarily attached to the outside of the plenum of separation volume 170. The non-electrical magnets may be selectively removed from the outside surface of separation volume 170 to facilitate collection of iron-rich material 180.

Separation volume 170 includes an input portion that is configured to receive transformed EAF dust material 120 from heat controlling region 160. In an embodiment, solid non-magnetic material 140 (e.g., stainless steel component materials) are collected in a collection area 145. In an embodiment, collection area 145 is located directly below the input portion of separation volume 170 such that solid material 140 that is not attracted to magnets 180 falls directly into collection area 145 upon entering separation volume 170. In alternative embodiments, collection area 145 may be located elsewhere in separation volume 170 or outside separation volume 170 and solid material 140 may be directed to collection area 145 via any means, method, or device known to those of skill in the art. In an embodiment, solid material 140 may include stainless steel additives including, for example, a chrome vanadium component. In other embodiments, solid material 140 may include any impurities or additional components of the original steel including, but not limited to, silicon, sulfur, phosphorous, lead, manganese, and tin.

In an embodiment, separation volume 170 may also include a cooling region 190. After passage into separation volume 170, gaseous material 150 of transformed EAF dust 120 flows into cooling region 190. In an embodiment, cooling region 190 includes a cooling air injection port 192 through which cooling air may be introduced into cooling region 190. In an embodiment, the cooling air may be mixed with a zinc oxide starter particle to encourage nucleation. In an embodiment, the zinc oxide starter particle may be at room temperature when mixed with the cooling air. In other embodiments, cooling region 190 may be cooled using any cooling means known to those of skill in the art.

In an embodiment, gaseous material 150 includes gaseous zinc. In additional embodiments, gaseous material 150 may include any impurities or additional components of the original steel in a gaseous state including, but not limited to, silicon, sulfur, phosphorous, lead, manganese, and tin. As the injected cooling air cools the gaseous zinc, the gaseous zinc reacts with the cooling air and is condensed into zinc oxide and falls into collection area 155. Different grades of zinc oxide will condense and fall out of gaseous material 150 at different temperatures. Accordingly, collection area 155 may have one or more sub-areas that respectively collect different grades of zinc oxide. In an embodiment, cooling region 190 and collection area 155 may extend tens of feet in length. In alternative embodiments, cooling region 190 and collection area 155 may have alternative dimensions according to the design needs of the specific EAF dust recycling apparatus. For example, in an embodiment, cooling region 190 may include a plenum about 30 feet (about 9.144 meters) in length, about 10 feet (about 3.048 meters) in width, and about 10 feet (about 3.048 meters) in height. The length of the plenum may be divided into multiple collection areas. For example, the plenum may be divided into three collection areas of approximately 100 square feet (about 9.29 square meters) each. In an embodiment, each collection area may have a collection chute extending downward at about a 45 degree angle to a collection port. To withdraw accumulated zinc oxide powder, the collection chutes and/or collection ports may be opened and the powder allowed to fall through the collection chutes and/or collection ports into a collection vessel.

Separation volume 170 also includes an output 195 that exhausts the remaining un-precipitated gaseous material 150. In an embodiment, output 195 includes a filtration system configured to filter the remaining un-precipitated gaseous material 150. In an embodiment, the filtration system may be configured to filter mercury or any other undesired materials produced via the separation process. In an embodiment, the filtration system may include a fluidized bed reactor, air scrubber, or off-the-shelf filter as known to those of skill in the art.

Figure 2:
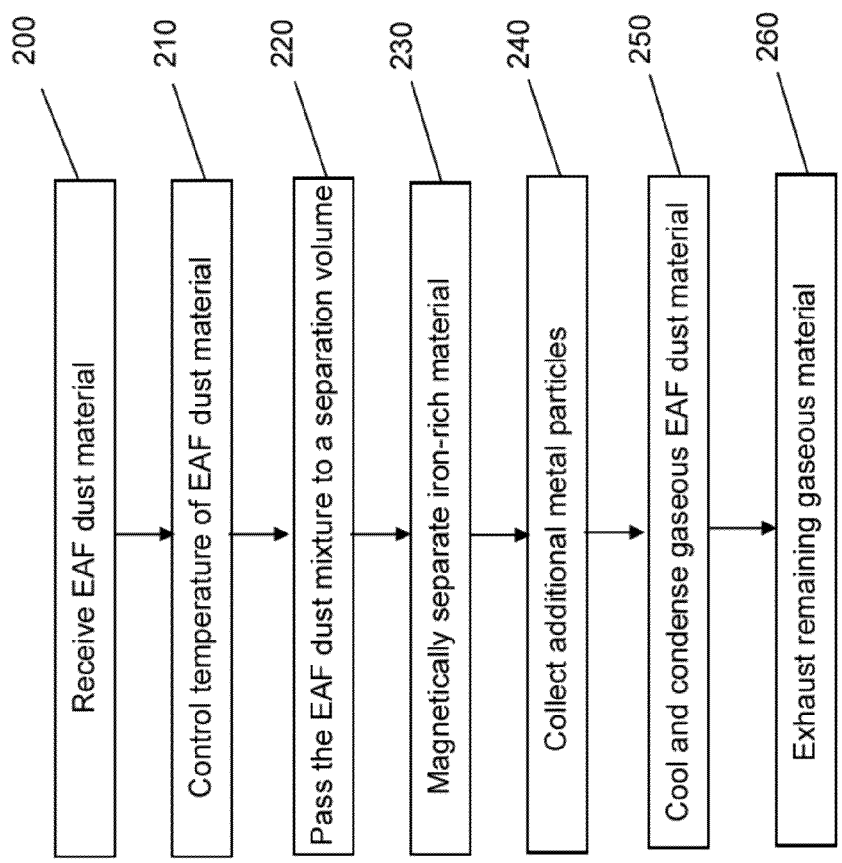
FIG. 2 depicts a flow diagram of a method for recycling EAF dust in accordance with an illustrative embodiment.

FIG. 2 depicts a flow diagram of a method for recycling electric arc furnace (EAF) dust in accordance with an illustrative embodiment. In an operation 200, EAF dust material is received at an input portion of an EAF dust recycling apparatus. In an embodiment, the input portion of the EAF dust recycling apparatus may be coupled to an output flow of a furnace such that the EAF dust material produced by the furnace is routed directly into the input portion of the EAF dust recycling apparatus. According to such an embodiment, the EAF dust material produced by the furnace may consist primary of heated arc furnace gases with few solid particles.

In another embodiment, the input portion may not be coupled directly to an output flow of a furnace, but rather may receive EAF dust material that has been cooled since being output from the furnace. In an embodiment, the cooled EAF dust material may be milled prior to being input into the EAF dust recycling apparatus in order to reduce the size of particles of the EAF dust material. In an embodiment, the cooled EAF dust material may be milled using a grinding mill or any other suitable device known to those of skill in the art.

In another embodiment, the EAF dust material is provided in a reducing atmosphere such as hydrogen or carbon monoxide gas. In addition, an additional reductant such as carbon powder or any other suitable reductant known to those of skill in the art optionally may be added to the reducing atmosphere and the EAF dust material prior to their input into the input portion of the EAF dust recycling apparatus. In an embodiment, a suitable amount of reductant is used such that all oxygen is removed from reducing atmosphere and portion of the reductant is left over to remove additional oxygen during subsequent processing of the EAF dust material. In another embodiment, the EAF dust material may be pH balanced using a gaseous neutralization process, water-based process, or via any other pH balancing process known to those of skill in the art.

In an operation 210, the temperature of the received EAF dust material is controlled by a heat controlling region to transform at least a portion of the received EAF dust material into a mixture of gaseous and solid components. For example, in an embodiment, the temperature of the received EAF dust material is controlled such that a mixture of gaseous zinc, solid iron-rich particles, solid stainless steel component material particles, and possibly additional metal particles is produced. In an embodiment, the temperature of the received EAF dust material is maintained between about 1665 degrees Fahrenheit (about 907 degrees Celsius) and about 2000 degrees Fahrenheit (about 1093 degrees Celsius). Such a temperature range allows for the iron-rich metals and other trace metals to substantially precipitate and form solid particles while allowing the zinc to remain in a substantially gaseous form.

In an embodiment where the input portion of the EAF recycling apparatus is directly coupled to an output of a furnace, the received EAF dust material may include primarily heated arc furnace gases that exceed 2000 degrees Fahrenheit (about 1093 degrees Celsius). According to such an embodiment, the heat controlling region of the EAF recycling apparatus may be configured to perform a controlled cooling of the EAF dust material/heated arc furnace gases so that the temperature of the EAF dust material/heated arc furnace gases is brought into the desired temperature range of between about 1665 degrees Fahrenheit (about 907 degrees Celsius) and about 2000 degrees Fahrenheit (about 1093 degrees Celsius) such that the iron-rich material and stainless steel component materials of the EAF dust material/heated arc furnace gases precipitates forming solid particles while maintaining the zinc components of the mixture in a gaseous form.

In another embodiment, the received EAF dust material may have an initial temperature at the time of input into the EAF dust recycling apparatus that is less than about 1665 degrees Fahrenheit (about 907 degrees Celsius). According to such an embodiment, the heat controlling region of the EAF dust recycling apparatus may heat the received EAF dust material to a temperature above about 1665 degrees Fahrenheit (about 907 degrees Celsius) but below about 2000 degrees Fahrenheit (about 1093 degrees Celsius) such that the iron-rich metals and other trace metals remain in substantially solid particle form while transforming zinc compositions into a substantially gaseous form.

In an operation 220, the transformed EAF dust mixture is passed from the heat controlling region of the EAF dust recycling apparatus to a separation volume that is configured to separate various components of the EAF dust mixture. The EAF dust mixture is introduced into the separation volume via an input portion of the separation volume. In an operation 230, the iron-rich material components of the EAF dust mixture is magnetically separated from the EAF dust mixture by one or more magnets within the separation volume. In an embodiment, as the EAF dust mixture passes into the separation volume the iron-rich material components of the EAF dust mixture are pulled toward the magnets and collected in an iron-rich material collection area of the separation volume.

In an operation 240, solid metal particles that are not attracted to the one or more magnets are collected in a second collection area of the separation volume. In an embodiment, the second collection area is located directly beneath an input portion of the separation volume such that upon entering the separation volume the solid metal particles that are not attracted to the one or more magnets fall directly into the second collection area. In alternative embodiments, the second collection area may be located elsewhere in separation volume or outside separation volume and the solid metal particles that are not attracted to the one or more magnets may be directed to the second collection area via a cyclone separator, a high temperature filter, or any other suitable means known to those of skill in the art.

In an operation 250, the gaseous EAF dust material from the EAF dust mixture is passed to a cooling region of the separation volume and is cooled and precipitated. In an embodiment, cooling air is introduced into the cooling region via a cooling air injection port. The cooling air may be filtered outdoor/ambient air and thus may have a temperature similar to that of the outdoor temperature (i.e., between about 0 degrees Celsius and about 35 degrees Celsius), although alternative temperatures and sources of cooling air are possible. In an embodiment, the cooling air may be mixed with a zinc oxide starter particle to encourage nucleation and formation of zinc oxide. In other embodiments, the cooling region may be cooled using any cooling means known to those of skill in the art.

In an embodiment, the gaseous EAF dust material includes gaseous zinc. As the injected cooling air cools the gaseous zinc, the gaseous zinc precipitates as zinc oxide and falls into a third collection area. Different grades of zinc oxide will precipitate and fall out of the gaseous EAF dust material at different temperatures. Precipitation of the zinc oxide occurs at temperatures below about 1665 degrees Fahrenheit (about 907 degrees Celsius). Different grades of zinc oxide are determined by uniformity of size and by quality of stoichiometry. In an embodiment, different grades of zinc oxide will precipitate and fall out at different respective locations within the cooling region of the separation volume, thus allowing for efficient collection of the different grades. Accordingly, the third collection area may have one or more sub-areas that respectively collect different grades of zinc oxide or other precipitated materials.

In an operation 260, the remaining un-precipitated gaseous EAF dust material is exhausted from the separation volume and possibly filtered. In an embodiment, a filtration system may be configured to filter mercury or any other undesired materials produced via the EAF dust recycling process. In an embodiment, the filtration system may include a fluidized bed reactor, air scrubber, or off-the-shelf filter as known to those of skill in the art.

EXAMPLES

In an example, an electric arc furnace processes steel having a batch size of about 100 tons. The electric arc furnace processes the steel for about 40 minutes, emitting gas throughout the processing. The electric arc furnace generates roughly 15 kilograms of gasified output material per ton of steel. The gasified output material is mixed with approximately 40 cubic meters of oxygen (at standard temperature and pressure) per ton of steel. The gasified output material includes mostly zinc (atomic weight 65.4 grams per mole) and iron (atomic weight 55.8 grams per mole) for an approximate atomic weight of 60.6 grams per mole. Accordingly, 15 kilograms of gasified output material includes approximately 247.5 moles of gas output per ton of steel, or approximately 5,600 liters (or 5.6 cubic meters) of gasified output material (at standard temperature and pressure) per ton of steel processed.

Approximately 10 percent of the oxygen that is injected into the steel as part of the electric arc furnace processing may be mixed with the gasified output material, resulting in an output from the electric arc furnace that includes about 4 cubic meters of oxygen and about 5.6 cubic meters of EAF dust/gasified output material per ton of steel. The gasified output material is passed directly from an output port of the electric arc furnace into an input portion of an EAF dust recycling apparatus. A forming gas with approximately 6 cubic meters of carbon monoxide (CO) reductant per ton of steel is introduced to the gasified output material received from the electric arc furnace. The carbon monoxide is introduced to absorb and remove the oxygen from the gasified output material. The carbon monoxide may be created by introducing carbon dust into the reducing atmosphere. Accordingly, approximately 10-15 cubic meters of gasified output material is created per ton of steel or approximately one thousand cubic meters of gasified output material for the entire 100 ton batch of steel. The approximately 1,000 cubic meters of gasified output material is processed during the approximately 40 minute processing time for the steel batch.

Upon discharge from the electric arc furnace, the gasified output material has a temperature of about 2000 degrees Fahrenheit (about 1093 degrees Celsius) to about 3500 degrees Fahrenheit (about 1927 degrees Celsius). The gasified output material is routed from the input portion of the EAF dust recycling apparatus to a heat controlling region where the gasified output material is cooled to between about 1665 degrees Fahrenheit (about 907 degrees Celsius) and about 2000 degrees Fahrenheit (about 1093 degrees Celsius). When accounting for the volume differential as a result of the ideal gas law (note that the previous volume estimations were based on standard temperature and pressure), the total volume of the gasified output material entering the heat controlling region is about 5,000 cubic meters (assuming a temperature of the gasified output material of about 2000 degrees Fahrenheit (about 1093 degrees Celsius). Distributing this volume over the 40 minute batch processing time, gives an air flow rate of the gasified output material through the heating controlling region of approximately 2 cubic meters per second.

In an alternative example embodiment, the gasified output material may be cooled into a solid EAF dust material prior to being input into the EAF dust recycling apparatus. Recycling of solid EAF dust material may involve less oxygen than recycle of gasified EAF dust material, and thus smaller amounts of reductants may be used during recycle of solid EAF dust material as opposed to gasified EAF dust material. In an embodiment, about 90 percent less reductant may be required for recycling of solid EAF dust material as opposed to gasified EAF dust material.

The heat controlling region includes process tubing formed from a refractory material such as ceramic. The tubing has a diameter of approximately 10 centimeters and a length of approximately 75 meters. The heat controlling region includes a meandering tube nest with 15 inductive heaters spaced every 5 meters along the tube. The inductive heaters are connected to a control circuit that is configured to maintain the heat controlling region at the desired temperature in response to feedback from temperature sensors positioned throughout the heat controlling region. Such a configuration provides for a 30 second thermal soak time for the gasified output material (assuming a flow rate of approximately 2 cubic meters per second) passing through the heat controlling region. Accordingly, the gasified output material is maintained at a temperature between about 1665 degrees Fahrenheit (about 907 degrees Celsius) and about 2000 degrees Fahrenheit (about 1093 degrees Celsius) within the heat controlling region for approximately 30 seconds, thus causing the precipitation of sold iron-rich particles, solid stainless steel component material particles, and possibly additional metal particles within a mixture of gaseous zinc and possibly other gases.

The mixture of solid particles and gaseous material from the heat controlling region is passed into a separation volume. The separation volume includes one or more electromagnets that may be selectively turned on and off. Upon passage into the separation volume, iron-rich particles from the mixture of solid particles and gaseous material are attracted to the electromagnets and pulled into a first collection area. An example electromagnet may include a iron core having dimensions of about 10 cm by about 20 cm and may require and electrical current of about 20 mA to about 250 mA for operation. Such an electromagnet can apply hundreds of pounds of force at short range and is able to pull iron-rich particles out of the aft as they decelerate upon entering the separation volume. Multiple electromagnets or a high permeability grating may be used to enlarge the first collection area for the iron-rich material. The amount of iron-rich material collected within the first collection area may vary according to the type of scrap used in the electric arc furnace. In an embodiment, the amount of iron-rich material collected may be about 1 to about 10 kilograms per ton of steel being processed.

Solid particles that are not attracted to the electromagnets fall as a result of gravity into a second collection area that is positioned directly below the input into the separation volume from the heat controlling region. These solid particles may include chrome vanadium, silicon, sulfur, phosphorous, and other non-magnetic materials. The amount of solid particles that are not attracted to the electromagnets and that are collected within the second collection area may vary according to the type of scrap used in the electric arc furnace. In an embodiment, the amount of these solid particles may be about 1 to about 10 kilograms per ton of steel being processed.

The gaseous portion of the mixture of solid particles and gaseous material, which includes primarily gaseous zinc, flows into a cooling region of the separation volume into which cooling air is injected via an injection port. The injected cooling air is at room temperature or about 70 degrees Fahrenheit (about 21 degrees Celsius). A zinc oxide starter is included in the cooling air to encourage nucleation of the zinc. In an embodiment, about 10 kg of zinc oxide starter per ton of steel processed may be used. The zinc oxide starter aids in cooling and increases zinc yield. The zinc oxide starter material may affect the final grade of the collected zinc oxide. For example, if the zinc oxide starter material is a low grade it will be mixed into all collection areas, thus decreasing the grade of the collected zinc oxide. If the grade of the collected zinc oxide is not important, the zinc oxide starter particles may be realized by capturing collected zinc oxide from a collection area and passing it through a pre-cooling stage and back to the cooling air injection port for re-entry into the cooling region of the separation volume. Alternately, if the grade of the collected zinc oxide is important, small amounts of high grade zinc oxide may be used for the zinc oxide starter particles. As the gaseous zinc cools below about 1665 degrees Fahrenheit (about 907 degrees Celsius) it oxidizes and condenses/precipitates, falling into a third collection region. In an embodiment, the amount of collected zinc oxide may be about 7 kg to about 10 kg per ton of steel processed.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for recycling electric arc furnace (EAF) dust material, the method comprising:
controlling a temperature of EAF dust material within a heat controlling region such that the temperature of the EAF dust material is sufficient to transform at least a portion of the EAF dust material into a mixture of gaseous zinc and one or more additional metals, wherein the one or more additional metals comprise iron-rich material and steel additives;
separating the iron-rich material from the mixture of gaseous zinc and one or more additional metals within a separation unit;
directing the gaseous zinc to a cooling region; and
condensing the gaseous zinc within the cooling region, wherein condensing the gaseous zinc is performed after separating the iron-rich material, and wherein the condensing the gaseous zinc comprises condensing zinc oxide into different grades that fall out at different locations within the separation unit.

2. The method of claim 1, wherein the heat controlling region comprises a vertical structure, and wherein controlling the temperature of the EAF dust material comprises inductively heating the EAF dust material as it falls within the vertical structure.

3. The method of claim 1, wherein the temperature sufficient to transform at least a portion of the EAF dust material into gaseous zinc and one or more additional metals is greater than about 910 degrees Celsius.

4. The method of claim 1, wherein condensing the gaseous zinc comprises introducing cooling air to the gaseous zinc.

5. The method of claim 4, further comprising introducing zinc oxide to the cooling air prior to introducing the cooling air to the gaseous zinc.

6. The method of claim 1, further comprising introducing a reducing agent to the EAF dust material prior to heating the EAF dust material.

7. The method of claim 6, wherein the reducing agent comprises one or more of carbon powder, carbon monoxide gas, or hydrogen gas.

8. The method of claim 1. further comprising pH balancing the EAF dust material prior to heating the EAF dust material.

9. The method of claim 1, further comprising milling the EAF dust material to reduce particle size of the EAF dust material.

10. The method of claim 1, wherein the controlling the temperature of EAF dust material comprises controlling cooling of EAF dust material recently released from an electric arc furnace.

11. The method of claim 1, wherein the separating the iron-rich material comprises magnetically separating the iron-rich material from the mixture of gaseous zinc and one or more additional metals.

12. The method of claim 2, wherein the condensing the gaseous zinc within the cooling region comprises moving the gaseous zinc horizontally through the separation unit.

13. The method of claim 12, wherein the separation unit includes one or more magnets configured to cause a horizontal displacement between the iron material and the steel additives when the iron-rich material and the steel additives fall within the separation unit.

* * * * *

UNITED STATES PATENT AND TRADEMARK OFFICE
CERTIFICATE OF CORRECTION

PATENT NO. : 8,845,780 B2
APPLICATION NO. : 13/386095
DATED : September 30, 2014
INVENTOR(S) : Kruglick Page 1 of 1

It is certified that error appears in the above-identified patent and that said Letters Patent is hereby corrected as shown below:

In the Specification

In Column 1, Line 22, delete "2007." and insert -- 2007, --, therefor.

In Column 2, Line 46, delete "pyronietallurgic" and insert -- pyrometallurgic --, therefor.

In Column 4, Line 55, delete "(La," and insert -- (i.e., --, therefor.

In Column 10, Line 55, delete "aft" and insert -- air --, therefor.

In the Claims

In Column 12, Line 66, in Claim 8, delete "claim1." and insert -- claim 1, --, therefor.

Signed and Sealed this
Seventeenth Day of March, 2015

Michelle K. Lee
*Director of the United States Patent and Trademark Office*